April 2, 1940.   M. N. DELEN   2,195,449
WATER COOLING AND CARBONATING DEVICE
Filed Oct. 26, 1939
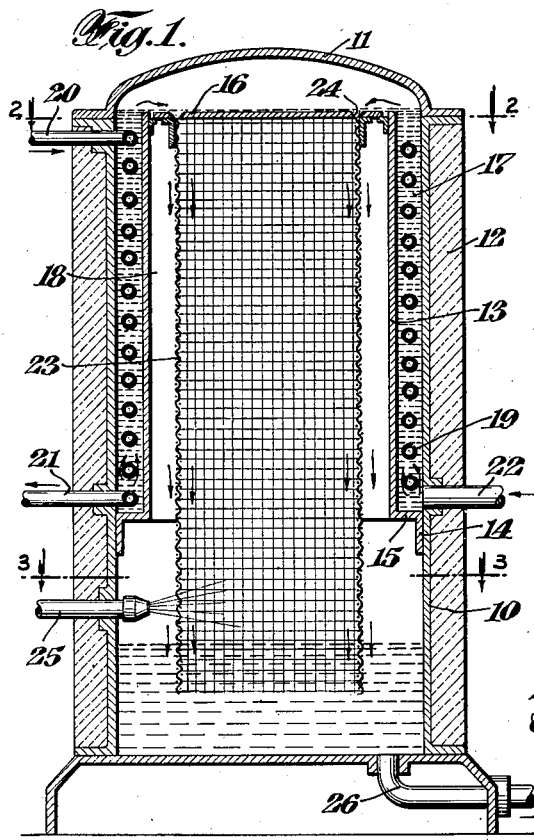
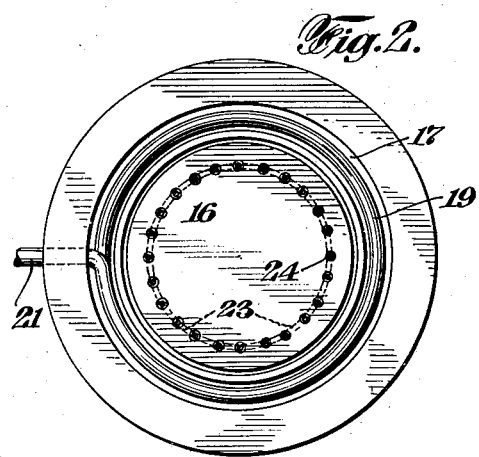
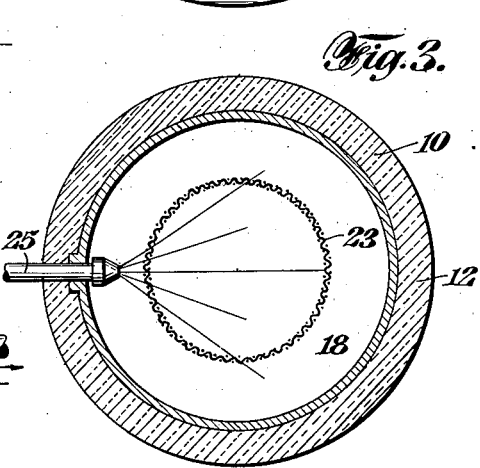
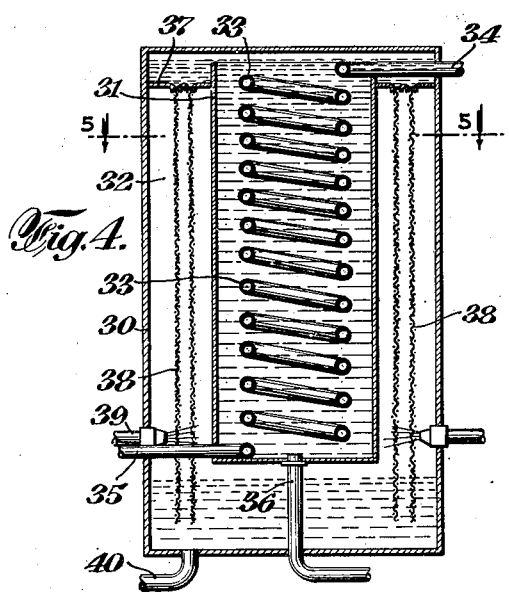
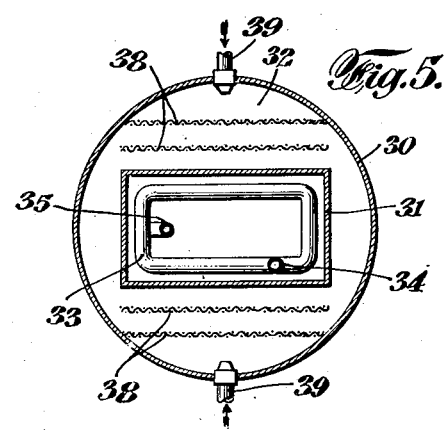
INVENTOR
Magnus N. Delen
BY Kenyon & Kenyon
ATTORNEYS Patented Apr. 2, 1940

2,195,449

UNITED STATES PATENT OFFICE 2,195,449

WATER COOLING AND CARBONATING DEVICE

Magnus N. Delen, New York, N. Y.

Application October 26, 1939, Serial No. 301,347

5 Claims. (Cl. 261—11)

This invention relates to water cooling and carbonating devices.

An object of this invention is a simple and inexpensive apparatus which will quickly and efficiently cool water and charge it with carbonic acid gas and take advantage of the fact that the ability of water to absorb gases increases as its temperature decreases.

Other objects, novel features and advantages of this invention will become apparent from the following specification and accompanying drawing, wherein:

Fig. 1 is a vertical section through an apparatus embodying the invention;

Fig. 2 is a section on the line 2—2 of Fig. 1;

Fig. 3 is a section on the line 3—3 of Fig. 1;

Fig. 4 illustrates in section a modified embodiment of the invention, and

Fig. 5 is a section on the line 5—5 of Fig. 4.

In the embodiment illustrated in Figs. 1 to 3, a cylindrical tank 10 is provided with a cover 11 and a layer of heat insulating material 12. Within the tank is a cylinder 13 which is offset at its lower end to form a flange 14 contacting the inner surface of the tank 10 and being welded or otherwise fixed thereto. The cylinder 13 thus forms an annular open top chamber having a bottom 15. The upper end of the cylinder 13 is closed by a plate 16 which has a fluid-tight connection at its periphery with the cylinder. The vertical and horizontal portions of the cylinder, together with the plate 16 constitute partitions dividing the tank into an open top chamber 17 and a closed chamber 18.

In the chamber 17 is provided a pipe coil 19 extending the full length of the chamber and having an inlet pipe 20 and an outlet pipe 21. A pipe 22 leads into the chamber 17 at the bottom thereof.

In the chamber 18 is provided a wire mesh cylinder 23 which is suspended from the plate 16 with its upper edge contacting the under face of the plate. In the plate 16 are provided apertures 24 arranged in alinement with the upper edge of the screen 23 and provided with passageways by which liquid may pass from the chamber 17 into the chamber 18. Near the bottom of the chamber 18 is provided a pipe 25 having a nozzle adjacent the screen 24 and also in the bottom of the tank is provided an outlet pipe 26.

In the operation of the above-described device, refrigerant is supplied to the coil 19 through the pipe 20 and is discharged from the coil through the pipe 21. Water is supplied to the bottom of the chamber 17 through the pipe 22 and is caused to flow upwardly in the chamber around the coil 19. The water is thus cooled as it flows upwardly counter-current to the flow of refrigerant in the coil 19. From the top of the chamber 17 the water overflows on to the plate 16 and through the apertures 24 and then trickles down the screen 23 both on the inside and outside thereof. Carbonic gas is introduced into the bottom of the tank through the pipe 25 and flows upwardly into contact with the descending water. Some of the gas penetrates the screen so that water both on the interior and exterior of the screen is thoroughly commingled with the gas. Charged water collects in the bottom of the tank and is conveyed to the pipe 26 to any suitable storage vat or directly to a bottling machine. The water is thoroughly cooled before it is contacted by the carbonic gas and thus advantage is taken of the fact that the ability of water to absorb gas increases as its temperature decreases. The water is supplied under proper pressure by means (not shown) to overcome the pressure of the carbonic gas and the latter is supplied under pressure ranging from 5 to 75 pounds, depending upon the extent of carbonation desired.

The principle of the invention illustrated in Figs. 4 and 5 is the same as that just described. In this modification, the tank 30 is furnished with vertical and horizontal partitions forming an open top chamber 31 and a closed chamber 32. In the closed chamber 32 is provided a refrigerating coil 33 having an inlet pipe 34 and an outlet pipe 35. Water is supplied to the bottom of the chamber 31 through a pipe 36 and overflows from the chamber 31 on to the top 37 of the closed chamber 32. In the closed chamber 32 are provided wire mesh screens 38 suspended by the top 37 which has passageways permitting the flow of liquid to the top ends of the screens. Near the bottom of the chamber 32 is provided one or more carbonic gas inlets 39. Also, an outlet 40 is provided from the bottom of the tank. The operation of this modification is the same as previously described.

I claim:

1. A device of the character described comprising a tank, vertical and horizontal partitions dividing said tank into a closed chamber and an open top chamber, a refrigerating coil in said open top chamber extending from top to bottom thereof, film forming means supported by the cover of the closed chamber and said cover having provision for flowing liquid therethrough to the upper edge of said screen, means for supplying liquid to the bottom of the open top chamber, means for flowing refrigerant downwardly through said coil, and means for supplying carbonic gas to both sides of the bottom portion of said screen.

2. In a unitary structure, an open top chamber, a closed top chamber, one of said chambers being in enclosing relation to the other and the edge of the open top chamber being at least level with the cover of the closed chamber, film forming means supported in the closed chamber from the cover thereof and said cover having provision for passing liquid through it to the top of said screen, means for supplying liquid to the bottom of the open top chamber, means to flow refrigerant downwardly through the open top chamber in indirect heat relationship to the liquid in said chamber, and means to supply carbonic gas to the lower part of said closed chamber.

3. A device of the character described comprising a closed tank, vertical and horizontal partitions dividing said tank into a first and a second chamber in enclosing relation one to the other with the first chamber having a portion overlying the second chamber, film forming means supported in said second chamber from the cover thereof and said cover having provision for passing liquid from the overlying portion of the first chamber to the upper edge of said screen, means for supplying liquid to the bottom of said first chamber, means for flowing refrigerant downwardly through said first chamber in indirect heat exchange relationship with the liquid in said chamber, and means to supply carbonic gas to the lower part of said second chamber.

4. A device of the character described comprising a tank, a cylinder within said tank forming an annular open top chamber with the upper portion of said tank, a plate closing the upper end of said cylinder, film forming means supported within said cylinder from said plate and said plate having provision for passing liquid through it to the top of said screen, means for supplying liquid to the bottom of said annular chamber, means for flowing refrigerant downwardly through said annular chamber in indirect heat exchange relationship to the liquid in said chamber, and means to supply carbonic gas to the lower portion of said tank adjacent the bottom portion of said screen.

5. A device of the character described comprising a tank, partitions dividing said tank into a first chamber and a second chamber with the first chamber having at least a portion overlying the top of the second chamber, film forming means supported in said second chamber from the cover thereof and said cover having provision for passing liquid through it to the top of said screen, means for supplying liquid to said first chamber, and means for supplying carbonic gas to the lower portion of said tank adjacent the lower end of said screen.

MAGNUS N. DELEN.